Dec. 15, 1953

R. L. LEADBETTER ET AL
PANEL HEATING SYSTEM AND INTEGRAL
TUBE AND CLIP FOR USE THEREIN
Filed Oct. 12, 1949

2,662,744

Inventors.
Ralph L. Leadbetter,
Alfred S. Chipley
and Charles P. Certik

Jones, Tesch & Darbo
Attys.

Patented Dec. 15, 1953

2,662,744

UNITED STATES PATENT OFFICE 2,662,744

PANEL HEATING SYSTEM AND INTEGRAL TUBE AND CLIP FOR USE THEREIN

Ralph Leon Leadbetter, Libertyville, Alfred S. Chipley, Mundelein, and Charles P. Certik, Deerfield, Ill., assignors to Burgess-Manning Company, Libertyville, Ill., a corporation of Illinois Application October 12, 1949, Serial No. 120,914

11 Claims. (Cl. 257—124)

This invention relates to panel heating, or what has come to be known as "radiant heating," systems; i. e., heating systems in which comparatively large surfaces, such as ceiling or wall surfaces, are heated or cooled by suitable means and serve to heat or cool the space and occupants thereof and objects therein by radiation from such extended surfaces. More especially, the invention relates to a particular structure for supporting and transmitting heat to or from a suspended ceiling or wall radiating surface.

Sheet metal has long been used as an exposed surface element of ceilings and walls. In some instances, as, for example, in suspended ceiling sound absorbing constructions shown in Norris Patent No. 1,726,500, the sheet metal panel elements are applied in the form of pans having broad surface areas and flanges which serve as stiffening and supporting means for the pans. The exposed face areas of such pans are perforated when used as part of an acoustical treatment. The pans are supported by fabricated sheet metal furring strips having resilient legs which engage the flanges of the pans and are, in turn, supported by suitable means from the principal ceiling or wall structure.

It has heretofore been proposed to provide an extended heat-radiating surface in the form of a suspended ceiling by arranging sheet metal pans to cover the ceiling and supporting the same by means of tubes or pipes through which hot water is circulated and which directly engage the flanges of the pans to support and heat the same. Pan constructions specifically designed and manufactured are necessary for this system.

The principal object of the present invention is to provide a suspended ceiling or wall type of panel system wherein the standard form of pan readily available on the market at all times is employed as the radiating element. A further and more specific object is to provide a combined tube and clip which serves to support the ceiling or wall structure and, at the same time, may be used as the heating or cooling element by circulating hot or cold water through the tubular element to heat or cool the same. The clip portion of the device resiliently engages the flanges of the pans whereby the pans may readily be assembled or disassembled in the ceiling or wall structure and the transfer of heat between engaging surfaces is permitted.

In the accompanying drawings.

The structure herein described may be employed either as a vertical wall surface or as a ceiling surface. It is generally preferable to use the ceiling of an enclosure as the source of heat in a radiant panel heating system and the principal description of the invention will be directed to the ceiling application, it being understood that the same structure may be employed for vertical wall installations where particular circumstances make such an installation desirable. One particular form of the apparatus is intended for use in vertical walls only as the detailed description thereof will make clear.

Figure 1:
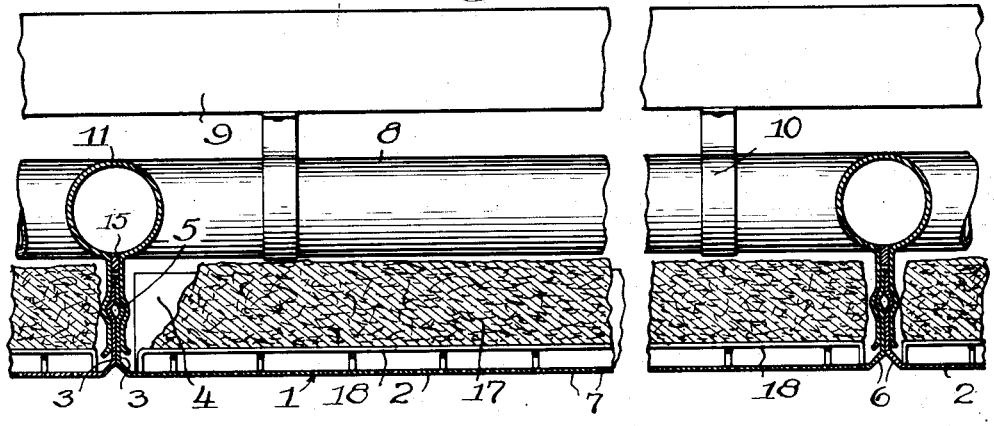
Fig. 1 is a sectional view of a suspended ceiling type of panel heating structure embodying the invention.

Referring to Fig. 1 of the drawing, the exposed ceiling surface which serves as the radiating source of heat for the enclosure or space below the ceiling is composed of sheet metal pans 1 having broad panel faces 2 and flanges 3 and 4. These pans are readily available on the market. A bead 5 is impressed inwardly in each of the opposed flanges 3 of each pan, this bead preferably extending the full length of the flange. The bead is parallel to the edge of the flange and is located between the edge of the flange and the juncture of the flange with the face of the pan. Bevels 6 are customarily formed at the peripheries of the pan faces to give the pan a tile-like appearance. If employed in a combination acoustical treatment, the pan faces are perforated, as at 7, to permit passage of sound.

The sheet metal pan thus described is a standard article of commerce in regular production and readily obtainable at reasonable cost. The pan is usually produced with a rectangular face, say, 12 x 24 inches, and a groove (not shown) is impressed across the face of the pan midway between the ends thereof to simulate the appearance of the joint between two adjacent pans. Flanges 4, which may be referred to herein as side flanges to distinguish them from end flanges 3, need not be provided with beads corresponding to bead 5, since these side flanges are not ordinarily employed for the support of the pan, but function merely to stiffen the pan. Also, a series of spaced dimples are sometimes used in place of beads 5, but the continuous bead is preferable for the purposes of the invention for reasons that will be pointed out hereinafter. The end portions of side flanges 4 may be cut off to provide clearance for supporting members where such clearance is necessary.

Although various arrangements of the circulatory system may be employed, that shown in Fig. 1 consists of a pair of headers 8 mounted at the junctures of opposite walls with ceiling structure 9. Any suitable means, such as hangers 10, may be used to support the headers.

A series of spaced, parallel tubes 11 connect the two headers, the tubes forming a grid work which spans the ceiling area. The tubes may be connected in series, rather than in parallel, if desired, the particular arrangement of the tubes being no part of the present invention. It is necessary only that they be horizontal (in the case of a ceiling installation), parallel, and accurately spaced apart for proper association with the flanges 3 of the pans which they support.

Figure 2:
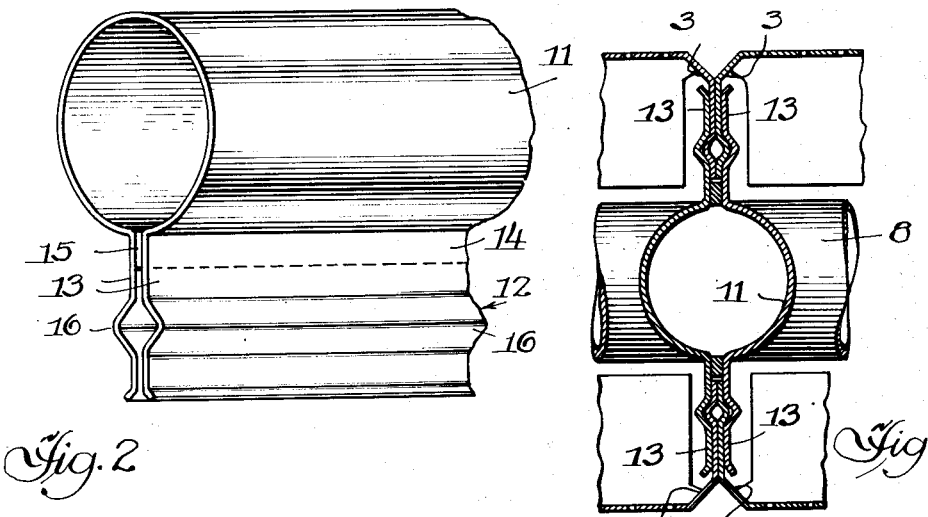
Fig. 2 is a perspective view of a portion of the combined tube and clip employed in the construction of Fig. 1.

In order to properly carry out the purposes of the invention, it is necessary not only to securely support pans 1 from tubes 11, but also to provide an efficient heat bridge between tube and pan for the conduction of heat to or from the radiating surfaces. To carry out these two requirements, a clip is provided as an integral part of each tube 11. As best seen in Fig. 2, each clip 12 consists of a pair of spaced, generally parallel legs 13 depending from the tubular portion of the device along the length thereof. The entire structure is formed from a single piece of sheet metal, the tube being rendered fluid-tight by welding the structure together along the seam at 14. A narrow strip 15 of metal having a thickness equal to twice that of the pan flanges is conveniently employed to properly space legs 13 apart. The entire structure is fabricated from resilient sheet metal, preferably a metal having a high coefficient of heat conductivity. The portions of legs 13 remote from tube portion 11 are normally closer together than the portions thereof adjoining strip 15 so that they must be forced apart as flanges 3 of the pans are inserted in the assembly of the structure and the flanges are engaged under constant spring tension. The extreme edges of the legs may be flared, as shown, to facilitate insertion of the pan flanges. Each leg of the clip is provided with an outwardly impressed bead 16 to cooperate with beads 5 of pan flanges 3 in supporting the pan structure. The inner surfaces of legs 13 should conform as nearly as possible to the surfaces of the flanges which they engage in order to assure adequate transfer of heat between the elements.

In the assembled ceiling, hot water may be circulated through headers 8 and tubes 11 to heat the tube walls. This heat is conducted to flanges 3 of the pans through legs 13. The heat continues to flow from the flanges to the faces 2 of the pans and is radiated from these surfaces to objects or persons exposed to the ceiling. During warm weather, cold water may be circulated through the tubes and heat is absorbed by the pans from the surroundings and conducted to the tubes and carried away by the cold water.

If the suspended ceiling is to serve as an acoustical treatment for the room, as well as a means for heating and cooling the same, pads 17 of mineral wool or other sound absorbing material are placed in pans 1 upon spacing grids 18. These pads also serve as heat insulation to minimize the dissipation of heat from pans 1 to the ceiling structure 9 above. If the suspended ceiling is not intended to function as an acoustical treatment, some form of thermal insulation would nevertheless ordinarily be used to cover the upper surface of the suspended ceiling.

In using the standard rectangular ceiling pans, tubes 11 may be spaced apart distances equal to the length of the pans or to the width of the pans, depending upon the desired heating or cooling capacity of the radiating surface. Mean temperatures of the pan faces are increased when the closer spacing is used since the heat from the tubes penetrates over larger areas of the pan faces. When the side flanges 4 are used for supporting and conducting heat to the pans, they should be beaded in the manner shown in flanges 3.

Figure 3:
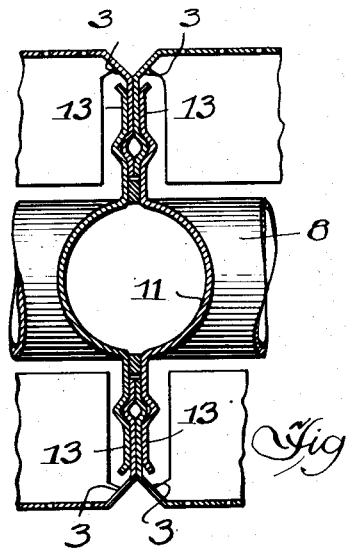
Fig. 3 is a horizontal section of a portion of a wall structure embodying a modified form of the invention.

A modified form of the invention, particularly adapted for use in vertical walls having two radiating surfaces, is shown in Fig. 3. In this particular structure, headers 8 are secured in position at the base of the wall and at the top of the wall. Tubes 11 are arranged vertically in parallel spaced relation to each other and connected with the headers to permit the flow of hot water, for example, from the base header into the tubes and thence into the top header. Instead of having a single pair of resilient legs 13, as shown in the device of Fig. 2, two pairs of such resilient legs 13 are provided at diametrically opposite locations. These elements, otherwise identical to the legs shown in detail in Fig. 2, are also formed as an integral part of the tube structure. Two identical elements, each comprising one of each of the two pairs of legs and half of the tube are welded together to form the combined tube and clip. Pans 1 are held in proper position by their flanges 3 in the same manner that the pans are supported in the ceiling structure of Fig. 1. These pans form the two surfaces of the wall and, since both are to serve as radiating surfaces, there is no need for thermal insulation and the empty pans may be used.

Figure 4:
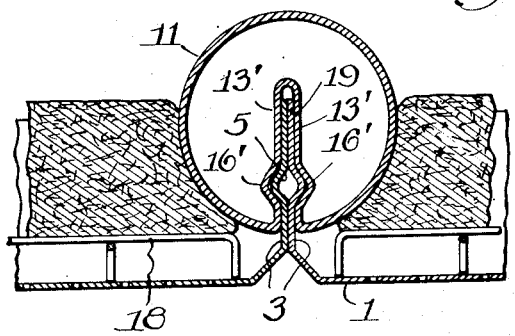
Fig. 4 is a detailed sectional view showing another form of the invention.

Many different forms of the combined tube and clip may be devised and used. The form shown in Fig. 4 illustrates an example of another possible modification, this particular device representing somewhat of a departure from the other forms in that the resilient legs are internal. It thus offers a more compact construction, being, at the same time, somewhat more expensive. In this form of the invention, the sheet metal of tube 11 is formed to provide a re-entrant groove 19. This is a deep groove whose side walls 13' function as resilient legs similar to legs 13 of Fig. 2. The opening of groove 19 is normally somewhat less than the thickness of the two flanges 3 of pans 1 so that when the flanges are inserted during the assembly of the ceiling or wall structure, the walls 13' of groove 19 will engage the flanges and hold the same under constant spring tension. Grooves 16' should be provided if flanges 3 are beaded as at 5.

In all of the forms of the invention herein described, the clip elements are integral with the walls of the tubes; i. e., they are formed as continuations of the same pieces of sheet metal which form the tubes. The principal advantage of such structure lies in the efficiency of heat conductivity from the tube walls to the clip surfaces which engage the pan flanges. Gaps and intersurface obstacles in the thermal path are minimized.

Variations of the specific structures shown herein will readily occur to those skilled in the art. For example, if several spaced dimples are used in place of the bead in the pan flanges, small openings may be provided in the legs of the clip to accommodate the dimples, the legs being otherwise flat. The pans with such dimpled flanges may be snapped into position, the openings permitting the legs to engage the flat surfaces of the flanges. Also, it should be pointed out that the clip forms may be made by extrusion, as well as by cutting and forming ordinary sheet metal stock, and that by properly adapting the shape of the clips, cylindrical pipes other than standard round pipes may be used. For example, pipes having polygonal sections may be used.

Invention is claimed as follows:

1. In a panel type heating and cooling system having a plurality of flanged sheet metal panels arranged side by side to form a wall or ceiling surface and including means for supporting and heating and cooling said panels comprising a plurality of spaced parallel fluid-tight tubes supported in back of said panels and adapted to conduct a fluid therethrough, that improvement wherein each said tube includes as an integral part thereof a pair of resilient elements which engage abutting flanges of a pair of adjacent panels under constant spring tension.

2. Structure in accordance with claim 1 wherein the surfaces of said resilient elements which engage said flanges are shaped to conform with the surfaces of said flanges.

3. Structure in accordance with claim 1 wherein said resilient elements extend outwardly along the length of said tube.

4. Structure in accordance with claim 1 wherein said tube has a deep re-entrant groove extending lengthwise in the tube and said resilient elements are constituted by the side walls of said groove.

5. In a panel type heating and cooling system having a plurality of sheet metal panels arranged side by side to form a wall or ceiling surface, said panels having beaded flanges and including means for supporting and heating and cooling said panels comprising a plurality of spaced parallel fluid-tight tubes supported in back of said panels, that improvement wherein each said tube is formed with a deep re-entrant groove extending lengthwise in the tube to provide a resilient element on each side of the groove, said groove being adapted to receive abutting flanges of a pair of adjacent panels, the side walls of said groove being shaped to conform with the contiguous surfaces of said flanges.

6. As a new article of manufacture, a combined unitary fluid-tight tube and clip comprising a tube of sheet metal and a pair of generally parallel resilient legs extending outwardly in spaced relation to each other from said tube along the length thereof, said tube and legs being formed from a single piece of sheet metal.

7. A wall construction comprising fluid-tight tubular upright supporting members, a plurality of flanged panels arranged side by side to form wall surfaces on both sides of said supporting members, each of said tubular supporting members having a pair of generally parallel resilient legs extending in spaced relation to each other outwardly from said tube along the length thereof at each of two diametrically opposed locations upon said tube, said resilient legs engaging the flanges of said panels to support the same.

8. As a new article of manufacture, a combined tube and clip comprising a fluid-tight tube of sheet metal and a pair of generally parallel resilient legs extending in spaced relation to each other outwardly from said tube along the length thereof at each of two diametrically opposed locations upon said tube.

9. An article in accordance with claim 8 wherein one of each pair of legs and one-half of the tube are formed from a single piece of sheet metal.

10. As a new article of manufacture, a combined tube and clip comprising a fluid-tight tube of sheet metal formed with a deep re-entrant groove extending lengthwise in the tube to provide a resilient element on each side of said groove.

11. An article in accordance with claim 10 wherein the side walls of said groove are provided with grooves running parallel to the axis of the tube.

RALPH LEON LEADBETTER.
ALFRED S. CHIPLEY.
CHARLES P. CERTIK.

References Cited in the file of this patent

UNITED STATES PATENTS

| Number | Name | Date |
|---|---|---|
| 2,059,483 | Parsons | Nov. 3, 1936 |
| 2,221,001 | Lucius | Nov. 12, 1940 |
| 2,349,158 | Fowles et al. | May 16, 1944 |
| 2,382,340 | Smith | Aug. 13, 1945 |

FOREIGN PATENTS

| Number | Country | Date |
|---|---|---|
| 241,602 | Switzerland | Mar. 31, 1946 |